Dec. 4, 1951 A. ROSE 2,577,038

TELEVISION COLOR PICTURE TUBE

Filed Feb. 25, 1950

INVENTOR
Albert Rose
BY
Roderick Malcolm
ATTORNEY

Patented Dec. 4, 1951

2,577,038

UNITED STATES PATENT OFFICE 2,577,038

TELEVISION COLOR PICTURE TUBE

Albert Rose, Princeton, N. J., assignor to Radio Corporation of America, a corporation of Delaware Application February 25, 1950, Serial No. 146,323

6 Claims. (Cl. 313—92)

This invention is in a cathode ray tube and more specifically in a television picture tube for viewing pictures in color. This application is a continuation-in-part of my co-pending application Serial No. 133,509, filed December 17, 1949.

One problem of color television reception is the complexity of the apparatus required for receiving television pictures in color. Past devices have included a plurality of cathode ray picture tubes, each supplying a picture in a single primary color, with the several colored pictures being recombined optically to form a panchromatic television picture. Other devices have utilized single tubes, combined with complex mechanical means such as colored discs synchronized to the incoming signals to produce pictures in color. Such devices, for reproducing television pictures in color, have been unduly complex and have resulted in many unsolved problems both electrical and mechanical.

A type of single color television tube is that suggested in the U. S. Patent 2,370,863 to Leverenz, in which the screen of the picture tube consists of parallel phosphor lines extending horizontally across the target surface. The phosphor lines are of a material which will provide red, green and blue luminescence and are arranged in sequence with green and blue luminescing lines following each red luminescing line. A cathode ray beam scans the target and is caused to provide a luminescence of a color corresponding to the color of the video signals used to modulate the beam. One problem experienced in tubes of this type is that of providing complete control of the electron beam, so that there is accurate registry of the beam with the correct phosphor color area of the screen. That is, if the screen is of parallel phosphor strips, difficulty has been experienced with the linearity of beam deflection to provide absolute registry of the beam trace with the phosphor strip. If the screen has the phosphor put down in arrangements other than parallel lines, the problem of beam registry with the correct phosphor coated screen area is also present.

It is, therefore, an object of my invention to provide a simplified means for receiving television pictures in color.

It is a further object of my invention to provide a single television picture tube which can be used with conventional systems to provide a television picture in color.

It is a further object of my invention to provide a single television viewing tube for use in an entirely electronic system for producing television pictures in color.

It is another object of my invention to provide a color television picture in which proper registry is maintained between the beam and the phosphor coated areas of the screen.

The specific invention described below is directed to a cathode ray tube for receiving television pictures in color. The tube comprises an evacuated envelope having an apertured target electrode positioned transversely of the beam path. Beyond the apertured target and between the target electrode and the observer is a transparent electron mirror electrode. The surface of the electron mirror facing the apertured electrode is of an irregular formation such that, during tube operation, the electrostatic field between the target and the mirror reflects that portion of the electron beam passing through the apertures of the target back to the target electrode and on to those portions of the target surface between the apertures. A phosphor coating is applied to the target surface facing the electron mirror so that the beam electrons reflected by the mirror will strike the phosphor coating to produce a luminescence. This phosphor coating may be put down in various groups and arrangements to provide colored luminescence. The particular light-emissive area, in a given group, to which the beam is directed at any given instant is determined, in part, by the velocity of the beam as it approaches the negatively charged mirror and, in part, by the instantaneous electrical contour of the mirror. The high degree of accuracy with which the reflected electrons are directed to a particular light-emissive area is due, in part, to the proximity of the mirror to the phosphor coated surface of the target and, in part, to the novel surface configuration (later described) of the mirror.

The novel features which I believe to be characteristic of my invention are set forth with particularity in the appended claims, but the invention itself will best be understood by reference to the following description taken in connection with the accompanying drawing, in which:

Figure 1:
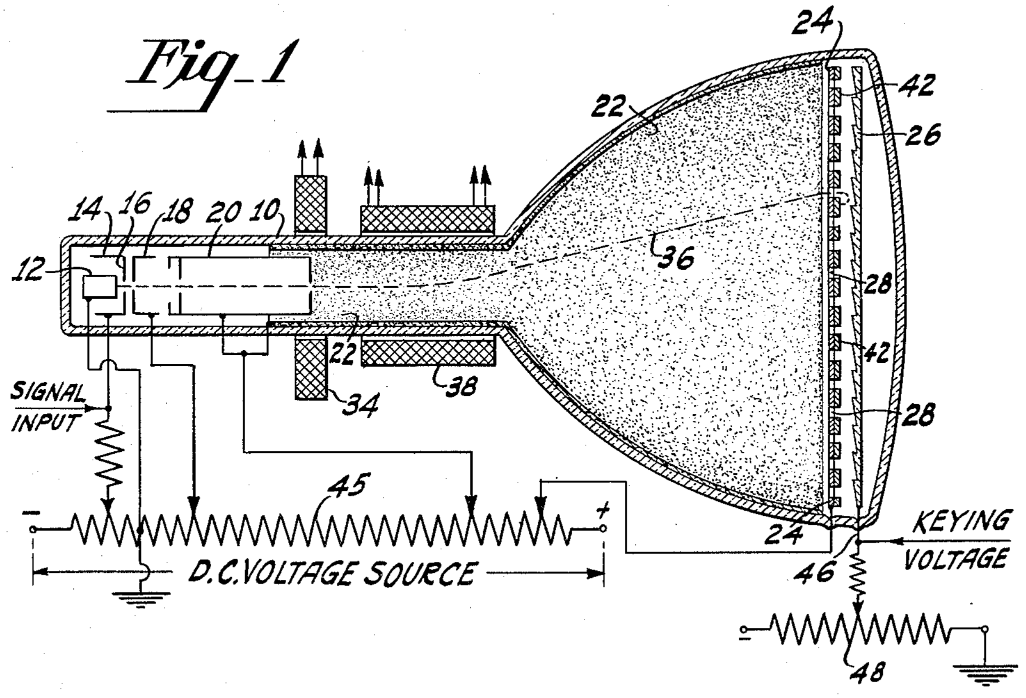
Fig. 1 is a longitudinal sectional view of a color kinescope embodying the invention. Appropriate circuit connections for the gun, the apertured target and the electron-mirror of the kinescope are shown schematically.

In Figure 1, there is disclosed a cathode ray tube having an evacuated envelope 10 formed with a neck portion and a bulb portion as is shown. Mounted within the neck portion of the envelope is an electron gun structure for producing an electron beam along a normal path. The electron gun structure is shown schematically and comprises essentially of a cathode electrode 12 consisting of a metal tube closed at the end facing toward the conical portion of the envelope. This closed end of the cathode electrode has coated thereon an electron emitting material which may consist of mixed oxides of barium and strontium, which upon being heated to an appropriate temperature provide a source of electron emission. Surrounding this coated end of the cathode electrode 12 is a tubular control electrode 14 having one end closed by an apertured grid plate 16. Axially spaced along the tubular portion of the envelope 10 and coaxial with the control electrode 14 are respectively second and third tubular electrode 18 and 20.

During normal tube operation, control electrode 14 is operated at some potential negative with respect to the potential of cathode 12, while electrode 18 is maintained at a positive potential of several hundred volts relative to cathode potential. Electrode 20 is maintained, during tube operation, at several thousand volts to provide a high acceleration of the electron beam. The electrodes 14, 18 and 20 together with the cathode electrode constitute an electron gun structure in which the electron emission from the cathode surface 12, is formed into an electron beam 36. In tubes of this type, incoming signals are applied to the negative control electrode 14 to density modulate the emission from cathode 12 in accordance with the signals. Electrode 18 provides a positive field for drawing the electron emission from the cathode through the negative aperture of grid 16. Between the positive electrodes 18 and 20 is provided a preliminary focusing field which gives the beam 36 a degree of convergence after its passage through electrode 18. Furthermore, electrode 18 screens this focusing field from fluctuations of the signal voltages applied to the control grid 14.

A wall coating 22 is applied, as is shown, to the inner surface of the tubular portion of envelope 10, adjacent one end of the electrode 20. Coating 22 is extended into the bulb portion of the tube envelope, and to a point adjacent the large end of the tube, as shown. Coating 22 is conductive and may be formed in a conventional manner from a colloidal suspension of carbon or graphite in an appropriate binder. As is shown in Fig. 1, coating 22 is electrically tied to the anode electrode 20 and thus, prevents the accumulation of static charges on the insulating glass walls of the envelope. Such accumulations of charge would provide distortion of the beam by the resulting spurious fields.

Positioned within the wide end of the envelope bulb portion, is a conductive target plate electrode 24 having a plurality of apertures 28 extending through the electrode from one face to the other. Also, positioned on the other side of the target electrode 24 from the electron gun, is an electron mirror electrode 26. As is shown in detail in Figure 2, the electron mirror electrode 26 comprises a sheet 30 of transparent material extending substantially parallel to and overlying the adjacent surface of electrode 24. The transparent sheet of material 30 has a profile section of saw-tooth configuration. In order to maintain a beam reflecting potential over the surface of the transparent sheet 30, a conductive film 32 is coated over the irregular surface of the sheet. However, transparent sheet 30 may of itself be conducting and thus, not necessitate the use of conductive film 32.

The electron beam 36 formed by the gun structure, described above, passes through a magnetic focusing field provided by a coil 34 concentrically mounted on the tubular neck portion of the envelope 10. As is well known, the field of coil 34 may be adjusted to provide a converging field, which will bring the electrons of the beam to a sharply defined point on the surface of target plate 24. Provision is made, as is well known in the art, to scan the electron beam 36 over the surface of target electrode 24. Such scanning means may be two pairs of magnetic coils arranged in a deflecting yoke 38, coaxially mounted on the neck portion of the tube envelope, as is shown in Figure 1. Each pair of deflecting coils forms a field perpendicular to the field of the other pair of coils and to the axis of the tube envelope 10. Each pair of coils is connected to appropriate circuits for supplying respectively, to the pairs of coils, saw-tooth voltages for providing, respectively, line and frame scansion of the electron beam over the surface of target 24. Such circuits and systems are well known and do not constitute any part of my invention, and thus are not described in further detail.

The surface of the target electrode 24, which faces the electron mirror electrode 26, has a coating 42 of phosphor material, which is adapted to provide a visible luminescence when excited by electron bombardment. In general, the operation of the tube of Figure 1 is that in which the electron beam 36 is focused on the target electrode 24 and is then scanned over the target surface in any desired manner. However, the manner of scanning of the beam may be conventional, such as that, for example, in which the beam is scanned in parallel lines from top to bottom of electrode 24. A portion of the electron beam will pass through the apertures 28 of electrode 24 and into the space between electrodes 24 and 26.

During tube operation, electrode 26 is normally maintained at a potential negative with respect to the potential of cathode electrode 12. Thus, the electrons of the beam approaching electrode 26 will meet a negative, retarding field, which will reflect the beam back toward electrode 24. Due to the irregular nature of the reflecting surface of electrode 26, the electrons returning to electrode 24 will not return in the same path but will be reflected at a small angle to strike the solid portions of electrode 24, which are coated with the phosphor material. These reflected electrons thus will cause the phosphor to luminesce and this luminescence may be then observed through the face plate of the tube enevelope 10 and the transparent electrode 26.

Figure 2:
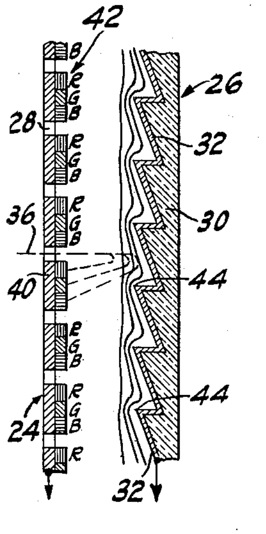
Fig. 2 is an enlarged sectional view of the target assembly of the color-kinescope of Fig. 1.

Figure 2 discloses in detail the construction and relationship of the electrodes 24 and 26. Electrode 24 may consist of an apertured metal plate 40. The apertures 28 of plate 40 are fine parallel slits running in the direction of line scansion of the electron beam. As is shown in Figure 2, the portions of plate 40 between the apertures 28 are coated with phosphor material 42, which may comprise of fine strips of red, green and blue luminescent phosphors indicated respectively by "R," "G" and "B" shown in section. Such color luminescing phosphors are well known. For example, the red luminescing phosphor material may be a cadmium borate activated with manganese, the green luminescing phosphor may be a form of willemite as manganese activated zinc silicate while the blue luminescing phosphor may be a titanium activated calcium-magnesium silicate. These fine strips or lines of colored phosphor material are positioned respectively in the same order between each pair of aperatures 28 and extend parallel to each other and to the parallel slits 28.

It is desirable that the width of the aperture-slits 28 be less than a picture element size, wherein a picture element size may be considered as the spot size of the focused electron beam on target 24, or as the smallest elemental surface area which can be resolved by the tube. For example, if the width of the target 24 from top to bottom is approximately 8 inches and the scanning system used comprises 525 lines, then the picture element width would be approximately 16 mils. For a target of this width, then, the distance between the apertures 28 would be approximately 16 mils. Furthermore, since the portion of the beam passing through each aperture 28 is meant to strike only the red, the green, or the blue phosphor at any particular instant, it is desirable then, that the beam portion passing through apertures 28 be at least ⅓ or less than the picture element. For this purpose, the width of the apertures 28 should not be greater than ⅓ of a picture element size, or approximately 4–5 mils in width, for the size of target described. Each phosphor coated strip of the target 24 between aperture slits 28, has, thus, a width substantially equal to a picture element size, or, in the example described, approximately 12–16 mils. These strips of target 24, between the apertures, are equally divided up between the three phosphor coatings, as described.

As shown in Figure 2, the irregular reflecting surface of electrode 26 has a profile saw-tooth configuration. If the target electrode 24 is formed of parallel slits 28, as described, then the reflective electrode 26 comprises a saw-tooth ribbed sheet, in which the pointed ribs 44 are parallel to each other and to the openings 28 of target 24. Furthermore, each pointed rib 44 has the same relative position between a pair of apertures 28 of target 24. This relationship is obtained by providing a spacing between adjacent ribs 44 equal to the spacing between adjacent slits 28. The positioning of parallel ribs 44 relative to apertures 28 is not critical but is somewhere between the apertures 28. In this manner, then, there is a pointed rib portion 44 of reflector electrode 26 for every phosphor coated strip of target 24. Also, the angle between the surfaces of the target 26 forming the saw-tooth ribs is not critical, but for example, may be substantially 45°, although any angle approximating 45°, plus or minus 20° is operable. The depth of the saw-tooth rib portions of reflector electrode 26 also, is not critical. The main purpose of the configuration of the reflective electrode 26 is to provide an irregular reflecting electrode for the beam. Coating 32, over the irregular surface of electrode 30 is formed as a transparent conductive coating either by evaporation of metal, or by some appropriate conductive material such as "Nesa" coating.

To operate a tube similar to that described in Figures 1 and 2, appropriate voltages are applied to the tube electrode parts by connecting the several electrodes to direct current voltage sources, as for example, a voltage divider 45. The point of voltage source to which the cathode 12 is connected may be taken as the reference or ground potential, as shown in Figure 1. Target electrode 24 is operated at several thousand volts more than the anode electrode 20—22. The conductive coating 32 of reflector electrode 26 is connected as is shown, by lead 46 to a variable negative voltage source 48 tied to cathode or ground potential. The potential of electrode 26 may be thus varied between cathode potential and substantially 50 volts negative with respect to cathode potential. A change in the potential of the conductive coating 32 will change the configuration of the field between electrodes 24 and 26 such that the reflected path of beam 36 will be changed. Thus, it is possible to vary the non-uniform field between electrodes 24 and 26 to reflect the electron beam back onto electrode 24 to strike any desired one of the phosphor strips 42. In this manner, then, certain keying voltages are applied to electrode film 32 to change the reflected beam from one color phosphor strip to any one of the other phosphor strips and in any desired sequence and time. In the tube of the type described, such keying voltages need to vary only between 10 and 100 volts. The operation of the tube is such that, due to the positioning of each pointed rib 44 relative to the phosphor coated surfaces between apertures 28, the electron beam, as it passes through each aperture, will approach a retarding electrostatic field of respectively similar configuration. For a specific voltage applied to electrode 32, the electron beam passing through each aperture is reflected to a corresponding phosphor strip. That is, as the electron beam is scanned over the surface of target 24, that portion of the beam passing through the apertures 28 will be reflected at every point to the same phosphor strip. Thus, for example, if the potential of elctrode coating 32 is set so that the reflected beam will strike a red phosphor strip when passing through any one aperture, then only the red phosphor strips will be struck by the reflected beam as the beam is scanned over the remaining surface of target 24. The potential of mirror electrode 26 may be then changed by applying keying voltages in any desired sequence of time and the requisite amount to shift the reflected beam to either the green or the blue series of colored phosphor strips. Simultaneously with the application of keying voltages to the electron mirror 26, video signal voltages are applied to the control grid 14, of the electron gun. It is obvious that for correct color reproduction the reflected beam must strike a phosphor strip simultaneously with the application to grid 14 of the video signal corresponding to the emitted color of the strip, and that the reflected beam must be shifted from one phosphor strip to another in synchronism with shifts in the applied video signals corresponding to the color signal received.

The above described tube of Figures 1 and 2 may be used with other types of color television systems, as long as the keying voltages applied to electrode 26 are tied to the shift in the video signals applied to the control grid 14. For example, if the color system used is that in which different colored frames are applied to the phosphor screen in sequence, then the electron beam is caused to scan electrode 24 to produce a red frame followed by a green frame and then a blue frame. To produce this result, the appropriate reflecting voltage is applied to electrode 26 to enable the reflected beam to strike only the corresponding color strips for each particular frame. Also, during each frame, the appropriate colored video signals are applied to the control grid 14 to modulate the beam. These synchronized potential changes of electrode 26 may be keyed with the received video signals by any appropriate circuit, such as for example, that disclosed in my co-pending application, Serial No. 133,509. When a new frame is scanned, a new series of video signals is applied to the control grid 14 while, during this new frame another voltage is applied to the conductive coating 32 to reflect the electron beam to another series of color strips corresponding to the video signals received. In a system in which each line scanned is of a different color or in which each elemental picture element is of a different color, such a tube will also operate as long as the voltage changes on electrode 26 are keyed with the color video signals applied to the control grid 14.

Figure 3:
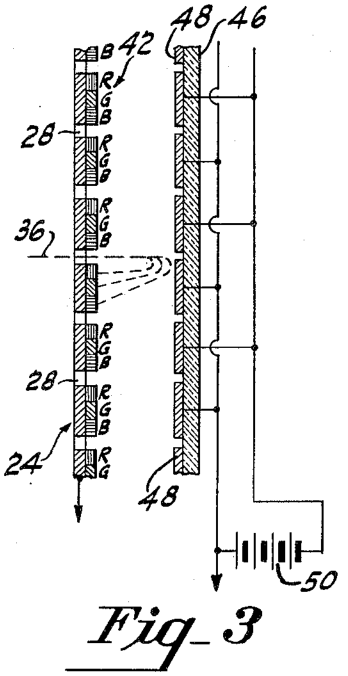
Figs. 3 and 4 are similar views of different target assemblies within the scope of the invention.

A modification of the target electrode structure is shown in Figure 3. In this modification, the target electrode 24 is formed in the same manner as that described for Figures 1 and 2 and the same identifying numbers for the several parts are used. The reflecting electrode, however, is formed of a transparent supporting sheet 46 formed of any desired material such as mica or thin glass. On the surface of the insulator sheet 46, facing electrode 24 are positioned a series of transparent conductive strips 48, which extend from one side of the target surface to the other and are substantially parallel to each other and also to the apertured slits 28 of the target 24. Alternate strips 48 are electrically tied together and to a common source of potential 50, so as to maintain adjacent strips 48 at a positive and negative voltage relative to each other. There is thus formed between adjacent strips and electrode 24, an electrostatic field which will tend to deflect the electron beam toward the more positive strip and simultaneously reflect the electron beam 36 back to the target surface 24 at an angle to the incident electron path. As described above, the average voltage of the conductive strips 48 is maintained at a negative potential relative to cathode potential to provide an electron reflecting field. Furthermore, there is applied to the conductive strips 48, a varying voltage keyed to the successive video color signals applied to control gird 14. These varying voltages alter the field between adjacent strips 48 to shift the reflected electron beam from one phosphor strip to another, and in a manner described above for Figures 1 and 2.

Figure 4:
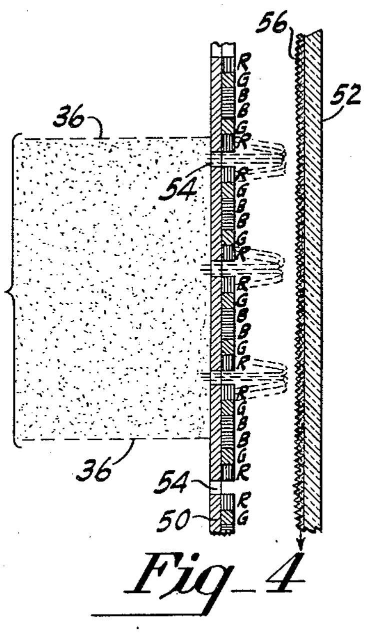

Figure 4 describes a third modification of the target electrode assembly. In this case, the mirror electrode comprises a transparent supporting sheet 52, spaced from an apertured plate electrode 50. The apertured sheet or plate 50 is preferably a metal sheet having parallel openings 54 therethrough corresponding with the apertures 28 of Figures 2 and 3. In a similar manner, apertures 54 are formed parallel to each other and substantially running the length of the target surface from one side to the other and parallel to the line scansion of the electron beam. Apertures 54, however, instead of being spaced a picture element apart, are, in the modification of Figure 4, spaced substantially the distance of two picture elements apart although the spacing may be less than a picture element. The phosphor strips are applied to the surface of the metal target shet 50 facing the reflective electrode 52. However, these phosphor strips are applied such that a specific phosphor strip is put down adjacent each aperture 54 and on both sides thereof. As shown for example, in Figure 4, each aperture is bounded by a red phosphor strip. On the other side of each red strip is a green strip followed by a single blue strip in the center. The phosphor strips are substantially ½ to ¼ a picture element size in width. The reflective surface 52 is formed of a rough conductive film 56, in which there are a plurality of irregularities for the distance of each aperture width. The irregularities of the conductive coating 56, need not conform to any specific design or arrangement, and are in no way critical to provide a non-uniform electron mirror. As in the modification described above in Figures 1 and 2, the conductive coating 56 is maintained, during the tube operation, at a negative potential relative to that of the cathode electrode, to provide a negative field reflecting the electrons of the beam back toward the positive electrode 50. The negative reflective potential applied to coating 56 may be set so that, as the electron beam approaches electrode 52, a certain amount of dispersion is given to the electrons of the beam, so that upon reflection, these electrons will strike the portion of the target electrode 50 coated by the red strips. Also, by a determinable change in the reflective potential applied to coating 56, a greater dispersion is given to the electrons so that they will strike substantially only the green strips or the blue strips. In a similar manner to that described above, the conductive coating 56 may have applied thereto keying voltages for causing the reflected electrons to be dispersed to the phosphor strips at a time sequence corresponding to respective color video signals simultaneously applied to the control grid 16.

The above-described color television viewing tubes have been limited to a type of masking target electrode in which the apertures 28 and 54 respectively have been described as parallel slits running lengthwise from side to side of the target electrode. To practice the invention, however, it is not necessary to be limited to such a design. It is possible to have any arrangement of apertures such as for example, series of small apertures arranaged in parallel lines or any other desired arrangement. Such a masking electrode is shown in the copending application Serial Number 730,637, filed February 24, 1947, by Alfred Schroeder. If such apertures are holes instead of slits through the metal sheet 24, the colored phosphors need not be strips, but may respectively be spots arranged in the proper position between adjacent apertures. Furthermore, the electrode 24 need not necessarily be an apertured plate but may also be formed from a metal grid or fine mesh screen in which portions of the grid or screen may be made opaque to the electron beam by an orderly disposition of material impervious to electron bombardment.

While the invention has been described in terms of specific embodiments, it is to be understood that other arrangements and modifications will be suggested to one skilled in the art without departing from the spirit and scope of the invention.

I claim as my invention:

1. An electron discharge device comprising, an electron gun structure for forming an electron beam along a path, a target electrode positioned transversely to said beam path, said target electrode having a plurality of apertures extending from one surface to a second surface thereof, means for scanning said electron beam over said one apertured target surface, a phosphor coating on said second apertured target surface, an electron mirror electrode positioned transversely to said beam path facing said second target surface for reflecting beam electrons passing through said apertured target onto said phosphor coating, and lead means connected to said mirror electrode for applying different voltages to change the paths of the reflected electrons.

2. An electron discharge device comprising, an electron gun structure for forming an electron beam along a normal path, a planar target electrode positioned transversely to said beam path, and having a plurality of apertures extending from one surface to a second surface thereof, means for scanning said electron beam over said one apertured target surface, a phosphor coating on said second apertured target surface, and a reflecting electrode positioned in closely spaced relation from said second target electrode, the surface of said reflecting electrode facing said apertured target being irregularly formed to reflect beam electrons passing through said apertured target to said phosphor coating.

3. An electron discharge device comprising, an electron gun structure including a cathode electrode for forming an electron beam along a normal path, an electron mirror electrode positioned transversely to said beam path, a conductive planar electrode positioned transversely to said beam path and between said mirror electrode and said electron gun, said planar electrode having a plurality of apertures extending between the surfaces thereof, means for scanning the electron beam over the surface of said planar electrode facing said electron gun, a plurality of different phosphor coatings on each portion of the other surface of said planar electrode between said apertures, the surface of said mirror electrode facing said planar electrode being irregular to provide a non-uniform field to reflect beam electrons passing through said apertured planar electrode to said phosphor coatings.

4. An electron discharge device comprising, an electron gun structure including a cathode electrode for forming an electron beam along a path, an electron mirror electrode positioned transversely to said beam path, a conductive planar electrode positioned transversely to said beam path and between said mirror electrode and said electron gun, said planar electrode having a plurality of apertures extending between the surfaces thereof, means for scanning the electron beam over the surface of said planar electrode facing said electron gun, a plurality of different phosphor coatings on each portion of the other surfaces of said planar electrode between said apertures, the surface of said mirror electrode facing said planar electrode having a ribbed profile configuration to provide a non-uniform reflecting field to return the beam electrons passing through said apertured electrode to said phosphor coatings.

5. An electron discharge device comprising, an electron gun structure including a cathode electrode for forming an electron beam along a path, an electron mirror electrode positioned transversely to said beam path, a conductive planar electrode positioned transversely to said beam path and between said mirror electrode and said electron gun, said planar electrode having a plurality of apertures extending between the surfaces thereof, means for scanning the electron beam over the surface of said planar electrode facing said electron gun, a plurality of different phosphor coatings on each portion of the other surface of said planar electrode between said apertures, the surface of said mirror electrode facing said planar electrode having a ribbed configuration with a saw-toothed profile to provide a non-uniform reflecting field to return the beam electrons passing through said apertured electrode to said phosphor coatings.

6. An electron discharge device comprising, an electron gun structure including a cathode electrode for forming an electron beam along a normal path, an electron mirror electrode positioned transversely to said beam path, a conductive planar electrode positioned transversely to said beam path and between said mirror electrode and said electron gun, said planar electrode having a plurality of parallel slit apertures extending between the surfaces thereof, means for scanning the electron beam over the surface of said planar electrode facing said electron gun, a plurality of different phosphor coatings on each portion of the other surface of said planar electrode between said slit apertures, the surface of said mirror electrode facing said planar electrode formed of parallel ribs each having a saw-toothed profile to provide a non-uniform reflecting field to return the beam electrons passing through said apertured electrode to said phosphor coatings, each of said saw-toothed ribs extending parallel to and positioned opposite to a portion of said other surface of said planar electrode.

ALBERT ROSE.

REFERENCES CITED

The following references are of record in the file of this patent:

UNITED STATES PATENTS

| Number | Name | Date |
|---|---|---|
| 2,125,599 | Batchelor | Aug. 2, 1938 |
| 2,264,709 | Nicoll | Dec. 2, 1941 |
| 2,446,249 | Schroeder | Aug. 3, 1948 |